G. I. ROCKWOOD.
PACKING RING FOR PIPE FITTINGS.
APPLICATION FILED NOV. 16, 1914.
1,133,320.
Patented Mar. 30, 1915.
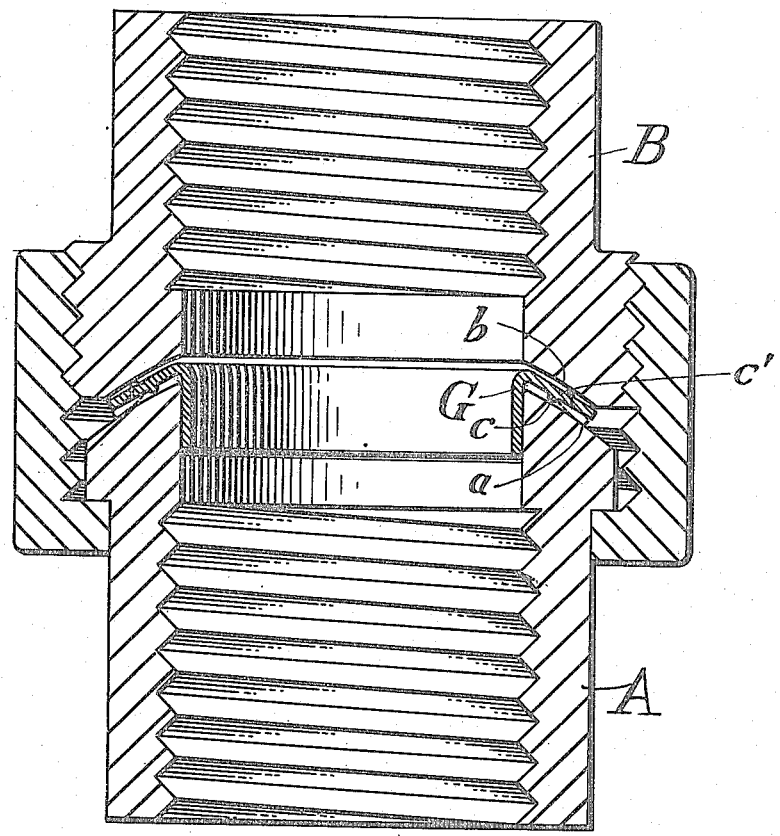
Witnesses:
C. F. Nesson
C. I. Hartnett
Inventor
Geo. I. Rockwood.
By Attorneys
Southgate & Southgate

UNITED STATES PATENT OFFICE.

GEORGE I. ROCKWOOD, OF WORCESTER, MASSACHUSETTS.

PACKING-RING FOR PIPE-FITTINGS.

1,133,320.     Specification of Letters Patent.     Patented Mar. 30, 1915.

Application filed November 16, 1914. Serial No. 872,352.

*To all whom it may concern:*

Be it known that I, GEORGE I. ROCKWOOD, a citizen of the United States, residing at Worcester, in the county of Worcester and State of Massachusetts, have invented a new and useful Packing-Ring for Pipe-Fittings, of which the following is a specification.

This invention relates to pipe fittings and is particularly adapted for use on pipe unions which are to be employed in places where the two pipes which are to be joined may not be exactly in axial alinement.

The principal objects of the invention are to provide a construction of packing ring for such a pipe fitting which will permit of the two members thereof being connected together in the usual way and will present a continuous seating surface around the pipe fitting, even when the two pipes to be connected are at a slight angle to each other, and even if the axes of the two pipes do not intersect; and also to provide a construction of soft metal packing which will be capable of yielding slightly under the pressure exerted in securing the two main members of the pipe fitting together so as to permit of bringing its surfaces fully into contact with the seating surfaces of the pipe fitting throughout the circumference thereof.

Reference is to be had to the accompanying drawing which is a central, sectional view of a pipe union with a soft metal packing ring constructed in accordance with this invention.

Ordinary spherical seated pipe unions with the usual plain soft metal packing rings therein usually are satisfactory when used on straight lines of pipes. It is sometimes necessary, however, to connect pipes which cannot be brought into exact alinement with each other, and in some cases their axes do not even intersect. In cases of this kind it is frequently found that the ordinary pipe unions cannot be seated up with sufficient tightness to prevent leakage.

By this invention, the difficulty is avoided by providing a comparatively narrow seating surface on the soft metal packing ring, and preferably upon both sides thereof, and furthermore, by so arranging this narrow seating surface that the outer edge of the ring is capable of yielding to the pressure of the parts and thus permitting the seating surfaces to be brought fully into contact with each other under the circumstances above mentioned.

Referring to the drawing, it will be seen that the invention is shown as applied to an ordinary type of pipe union having a male member A and a female member B the former provided with a convex seating surface $a$, and the latter with a concave seating surface $b$. These surfaces are ground to fit each other and in the usual practice, the soft metal packing ring is inserted between them.

According to the present invention, a concavo-convex packing ring C of copper, bronze, brass or other metal or alloy is employed between the two seating surfaces $a$ and $b$. This packing ring is formed with a narrow rib $c$ on its concave surface. This rib preferably is of circular shape, concentric with the center of the packing ring, and is integral therewith. It consists of a convex enlargement struck up from the metal of the packing ring when the latter is made and thus does not add to the expense of manufacture, except the mere expense of forming a groove in the die. It is permanent part of the packing ring and is uniform throughout its circumference. It is preferred, also, to provide a similar ring $c'$ on the convex surface of the packing ring. This rib $c'$ is also circular and concentric, but the radius of this circle is larger than that of the circle on which the rib $c$ is formed so that the rib $c'$ is off-set outwardly from the rib $c$. The reason for this arrangement will be obvious from a consideration of the dotted lines shown in the figure. The full lines indicate the shape of the packing ring as it is manufactured, but when the members A and B are forced together in the usual way, the pressure exerted on the rib $c'$ tends to spring the outer edge of the packing ring toward the surface $a$ and this distortion is indicated in dotted lines. In this way it will be seen that if the position of the two pipes, and therefore of the two members A and B, is such that they can not be brought into axial alinement, sufficient pressure can be put on the members A and B in the usual way to force inwardly the side of the packing ring that is on the inside of the angle made by the two members. In this way the packing ring can be distorted until the rib $c'$ is in firm contact throughout its circumference with the surface $b$ and likewise the rib $c$ will be forced to lie firmly against the surface $a$ throughout its circumference. In this way a packing is secured between the two surfaces $a$ and $b$ which is certain to be tight if the union is properly tightened up, even if the axes of the pipes to be connected do not intersect, as has been stated. Furthermore, it is an exceedingly cheap construction, can be used on various makes of pipe unions and other fittings, and does not involve any material outlay for equipment. It will be observed also that even in the absence of the rib $c'$ on the convex surface of the packing ring, the surface $b$ would come into contact with the convex surface of the ring and if the angle of the pipes was such that one side of the ring C projected too far toward the surface $b$, that would be forced inwardly at the edge so that the parts would be brought into firm contact all around. Moreover, even in the absence of the possibility of distorting the packing ring itself, it will be seen that the small ribs can be caused by pressure to conform to the shape of the hard metal surfaces. Even in this way the joint can be kept tight.

Although I have illustrated and described only a single embodiment of the invention, I am aware of the fact that many modifications can be made therein by any person skilled in the art without departing from the scope of the invention as expressed in the claims. Therefore, I do not wish to be limited to all the details of construction herein shown and described, but What I do claim is:—

1. In a pipe union, the combination with two members having respectively a concave and a convex seating surface, of a packing ring located between said surfaces and having a continuous narrow rib for engaging said convex seating surface, and provided also with a similar continuous narrow rib on its opposite side for engaging said concave seating surface.

2. In a pipe union, the combination with two members having respectively a concave and a convex seating surface, of a packing ring located between said surfaces and having a circular convex rib for engaging said convex seating surface, and provided also with a similar circular rib on its opposite side for engaging said concave seating surface, the last named rib having a diameter greater than the first named rib and being located outside the same, whereby when said seating surfaces are pressed together, the outer edge of the packing ring will be caused to spring over slightly at the first named rib.

3. In a pipe union, the combination with two members having respectively a concave and a convex seating surface, of a packing ring located between said surfaces and having a continuous rib for engaging said convex seating surface.

In testimony whereof I have hereunto set my hand, in the presence of two subscribing witnesses.

GEORGE I. ROCKWOOD.

Witnesses:
  ALBERT E. FAY,
  C. FORREST WESSON.